United States Patent
Yang et al.

(10) Patent No.: US 8,934,266 B2
(45) Date of Patent: Jan. 13, 2015

(54) ADAPTIVE SLOPE COMPENSATION PROGRAMMABLE BY INPUT VOLTAGE OF POWER CONVERTER

(75) Inventors: Ta-Yung Yang, Milpitas, CA (US); Li Lin, Taipei (TW); Yue-Hong Tang, Nantou County (TW)

(73) Assignee: System General Corp., Taipei (TW)

( * ) Notice: Subject to any disclaimer, the term of this patent is extended or adjusted under 35 U.S.C. 154(b) by 171 days.

(21) Appl. No.: 13/591,207

(22) Filed: Aug. 21, 2012

(65) Prior Publication Data

US 2013/0051098 A1    Feb. 28, 2013

Related U.S. Application Data

(60) Provisional application No. 61/527,814, filed on Aug. 26, 2011.

(51) Int. Cl.
*H02M 3/335* (2006.01)

(52) U.S. Cl.
USPC .......................................... 363/21.12; 363/97

(58) Field of Classification Search
CPC .............. H02M 3/335; H02M 3/3385; H02M 2001/0025; H02M 2001/0032
USPC ......... 363/21.09, 21.12, 21.13, 21.16, 40, 95, 363/97, 131, 89, 25; 323/207, 237, 271, 323/222, 282–288
See application file for complete search history.

(56) References Cited

U.S. PATENT DOCUMENTS

| | | | |
|---|---|---|---|
| 5,831,837 A * | 11/1998 | Coyne et al. | 363/21.08 |
| 5,859,768 A * | 1/1999 | Hall et al. | 363/21.13 |
| 5,903,452 A * | 5/1999 | Yang | 363/97 |
| 5,912,549 A * | 6/1999 | Farrington et al. | 323/207 |
| 6,750,637 B2 * | 6/2004 | Nagaki et al. | 323/272 |
| 7,239,532 B1 | 7/2007 | Hsu et al. | |
| 7,378,822 B2 * | 5/2008 | Liao | 323/222 |
| 7,616,461 B2 | 11/2009 | Yang et al. | |
| 7,671,578 B2 | 3/2010 | Li et al. | |

OTHER PUBLICATIONS

Office Action of China Counterpart Application , issued on Jun. 4, 2014, p. 1-p. 6, in which the listed reference was cited.

* cited by examiner

*Primary Examiner* — Rajnikant Patel
(74) *Attorney, Agent, or Firm* — Jianq Chyun IP Office

(57) ABSTRACT

A method for controlling a power converter is provided. The method includes the following steps. A switching signal coupled to switch a transformer for regulating the output of the power converter is generated in accordance with a feedback signal and a ramp signal. The ramp signal is generated in accordance with a switching current signal and a slope compensation signal. The slope compensation signal is generated in response to an input voltage signal. The input voltage signal is generated in response to the level of the input voltage of the power converter. The feedback signal is generated in accordance with the output of the power converter, and the switching current signal is correlated with a switching current of the transformer.

10 Claims, 3 Drawing Sheets

US 8,934,266 B2

ADAPTIVE SLOPE COMPENSATION PROGRAMMABLE BY INPUT VOLTAGE OF POWER CONVERTER

CROSS-REFERENCE TO RELATED APPLICATION

This application claims the priority benefits of U.S. provisional application Ser. No. 61/527,814, filed on Aug. 26, 2011. The entirety of the above-mentioned patent applications is hereby incorporated by reference herein and made a part of this specification.

BACKGROUND OF THE INVENTION

1. Field of the Invention

The invention provides an adaptive slope compensation for the power converter. The slope compensation is programmable in response to the change of the input voltage of power converter for achieving a better feedback loop stability and response.

2. Description of Related Art

Various power converters have been widely used to provide regulated voltage and current from the power source to the load. For the sake of safety reasons, an off-line power converter must provide isolation between its primary side and its secondary side. In case that a control circuit is equipped at the primary side of the power converter, an opto-coupler and a secondary-side regulator are needed to regulate an output voltage and an output current of the power converter. The object of the present invention is to provide a PWM controller for controlling the output voltage and the output current of the power converter at the primary side without the need of the opto-coupler and secondary side regulator. Therefore, the size and the cost of the power converter can be reduced.

SUMMARY OF THE INVENTION

The invention provides a method for controlling a power converter. The method includes the following steps. A switching signal coupled to switch a transformer for regulating the output of the power converter is generated in accordance with a feedback signal and a ramp signal. The ramp signal is generated in accordance with a switching current signal and a slope compensation signal. The slope compensation signal is generated in response to an input voltage signal. The input voltage signal is generated in response to the level of the input voltage of the power converter. The feedback signal is generated in accordance with the output of the power converter, and the switching current signal is correlated with a switching current of the transformer.

In an embodiment of the invention, the slope compensation signal is synchronized with the switching signal.

In an embodiment of the invention, the level of the switching current signal is controlled by the level of the input voltage of the power converter.

In an embodiment of the invention, the input voltage signal is generated through the detection from a winding of the transformer.

In an embodiment of the invention, the method further includes the following steps. A maximum switching frequency of the switching signal is limited. The switching signal is switched on in response to a signal detected from a winding of the transformer.

The invention provides a power converter, comprising a control circuit, a first voltage divider and a transformer. The control circuit generates a switching signal. The first voltage divider is coupled to the control circuit. The transformer is coupled to the first voltage divider. The transformer and the first voltage divider generate an input voltage signal in response to the level of an input voltage of the power converter. The switching signal is coupled to switch the transformer for regulating an output of the power converter in accordance with a feedback signal and a ramp signal. The control circuit includes a second voltage divider and a signal generation unit. The second voltage divider generates the ramp signal in accordance with a switching current signal and a slope compensation signal. The signal generation unit is coupled to the second voltage divider. The signal generation unit generates the slope compensation signal in response to the input voltage signal. The feedback signal is generated in accordance with the output of the power converter, and the switching current signal is correlated with a switching current of the transformer.

In an embodiment of the invention, the slope compensation signal is synchronized with the switching signal.

In an embodiment of the invention, the level of the switching current signal is controlled by the level of the input voltage of the power converter.

In an embodiment of the invention, the input voltage signal is generated through the detection from a winding of the transformer.

In an embodiment of the invention, the control circuit further includes a pulse generation circuit. The pulse generation circuit switches on the switching signal in response to a signal detected from a winding of the transformer, and the pulse generation circuit includes an oscillation circuit. The oscillation circuit includes a frequency limiting unit for limiting a maximum switching frequency of the switching signal.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
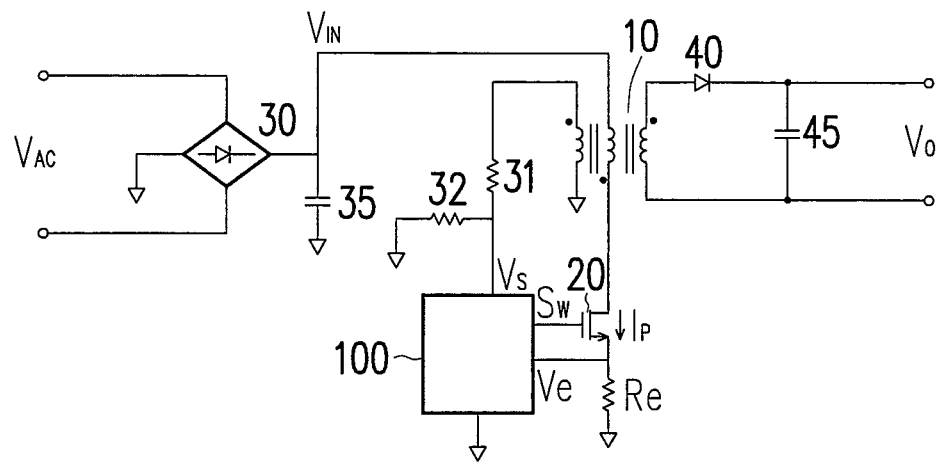
FIG. 1 shows an illustrative example of a power converter based on the invention.

FIG. 1 shows an illustrative example of a power converter based on the invention. A bridge rectifier 30 is connected to an input alternative current voltage $V_{AC}$ and a capacitor 35 to convert the input AC voltage $V_{AC}$ to a DC input voltage $V_{IN}$. A control circuit 100 generates a switching signal $S_W$ for switching a transformer 10 through a power transistor 20. The switching signal $S_W$ is generated according to a feedback signal $V_B$ (shown in FIG. 2 and FIG. 3) for regulating the output of the power converter 400. The auxiliary winding of the transformer 10 and the resistors 31 and 32 produce a signal $V_S$ coupled to the controller 100 for generating the feedback signal $V_B$. A rectifier 40 and a capacitor 45 are coupled to the secondary winding of the transformer 10 for generating the output voltage $V_O$ of the power converter 400. When the switching signal $S_W$ turns on the power transistor 20, a switching current $I_P$ of the transformer 10 and a current sense resistor $R_e$ will generate a switching current signal $V_e$ coupled to the controller 100 for the current-mode pulse width modulation (PWM).

Figure 2:
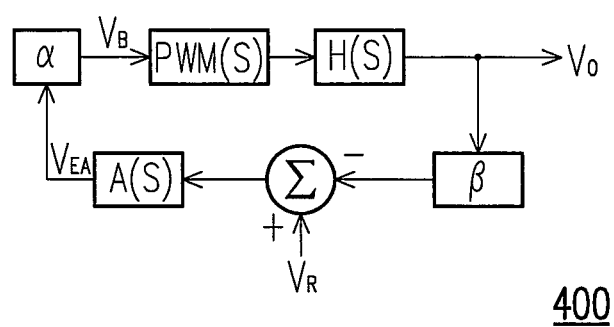
FIG. 2 shows a feedback scheme of the power converter of FIG. 1.

FIG. 2 shows a feedback scheme of the power converter of FIG. 1. β shows a functional circuit that detects the output voltage $V_O$, and α shows a functional circuit that generates a feedback signal $V_B$ according to the output signal $V_{EA}$ of the error amplifier A(s). $V_R$ is a reference voltage of the error amplifier A(s). H(s) shows an output impedance $Z_O$ of the output of the power converter 400, which is determined by the capacitor 45 and the output load of the power converter 400. A block PWM(s) shows the transfer function ($\Delta V_O / \Delta V_B$) of the switching stage of the power converter 400.

$$\frac{\partial V_o}{\partial V_B} = \frac{\partial V_o}{\partial t_{on}} \times \frac{\partial t_{on}}{\partial V_B} \quad (1)$$

$$V_o = I_S \times Z_O = \frac{N_P}{N_S} \times I_P \times Z_O = \frac{N_P}{N_S} \times \frac{V_{IN}}{L_P} \times \frac{t_{on}}{T} \times Z_O$$

$$V_B = V_e = I_P \times R_e + \frac{V_{SL}}{T} \times t_{on} = \frac{V_{IN}}{L_P} \times \frac{t_{on}}{T} \times R_e + \frac{V_{SL}}{T} \times t_{on}$$

$$\frac{\partial V_o}{\partial V_B} = \frac{N_P}{N_S} \times Z_O \times \frac{1}{R_e + \left(\frac{V_{SL}}{V_{IN}}\right)}$$

where $t_{on}$ is the on-time of the switching signal $S_W$; T is the switching period of the switching signal $S_W$; $N_P$ and $N_S$ are primary and secondary winding-turns of the transformer 10; $L_P$ is the inductance of the primary winding of the transformer 10; $V_{SL}$ is a part value of a slope compensation signal $V_M$.

The equation (1) shows that the gain of PWM(s) transfer function increases in response to the increasing amount of the input voltage $V_{IN}$. Therefore, the part value $V_{SL}$ of the slope compensation signal $V_M$ is configured to be increased in response to the increase amount of the input voltage $V_{IN}$, which improves the feedback loop stability of the power converter 400.

Figure 3:
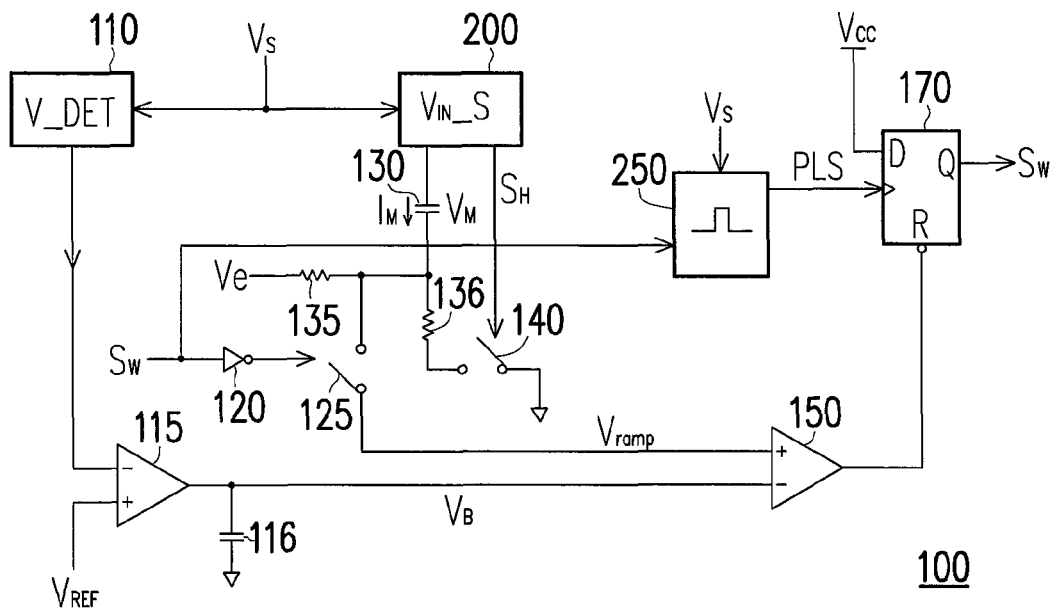
FIG. 3 shows an embodiment of the control circuit 100 according to the invention.

FIG. 3 shows an embodiment of the control circuit 100 according to the invention. A signal detection circuit 110, represented as V_DET in FIG. 3, is coupled to detect the signal $V_S$ for generating a $V_{DET}$ signal coupled to an error amplifier 115. The error amplifier 115 comprises a reference voltage $V_{REF}$. A capacitor 116 is coupled to the output of the error amplifier 115 for the frequency compensation. The output of the error amplifier 115 generates a feedback signal $V_B$ coupling to a comparator 150 for generating a reset signal for pulse width modulation.

The signal $V_B$ is coupled to a negative input of the comparator 150 to compare with a ramp signal $V_{ramp}$ and generate a signal to reset a flip-flop 170 for turning off the switching signal $S_W$. The flip-flop 170 is turned on by a pulse signal PLS for generating the switching signal $S_W$. The pulse signal PLS is generated by a pulse generation circuit 250 in response to the signal $V_S$, which is the signal of the auxiliary winding of the transformer 10. The ramp signal $V_{RAMP}$ is developed by the switching current signal $V_e$ and the slope compensation signal $V_M$. An input control circuit 200, represented as $V_{IN}$_S in FIG. 3, generates a modulation signal $I_M$ and a control signal $S_H$ in response to the level of the input voltage $V_{IN}$. The switching current signal $V_e$ is coupled to generate the ramp signal $V_{RAMP}$ through a voltage divider formed by resistors 135 and 136. The control signal $S_H$ is coupled to control the ratio of the voltage divider via a switch 140. A capacitor 130 is coupled to receive the modulation signal $I_M$ for generating the slope compensation signal $V_M$. The switching signal $S_W$ is coupled to discharge the slope compensation signal $V_M$ through a switch 125 and an inverter 120. Thus, the slope compensation signal $V_M$ is synchronized in response to the switching signal $S_W$. The slope compensation signal $V_M$ is increased in response to the increase of the modulation signal $I_M$ and the input voltage $V_{IN}$.

Figure 4:
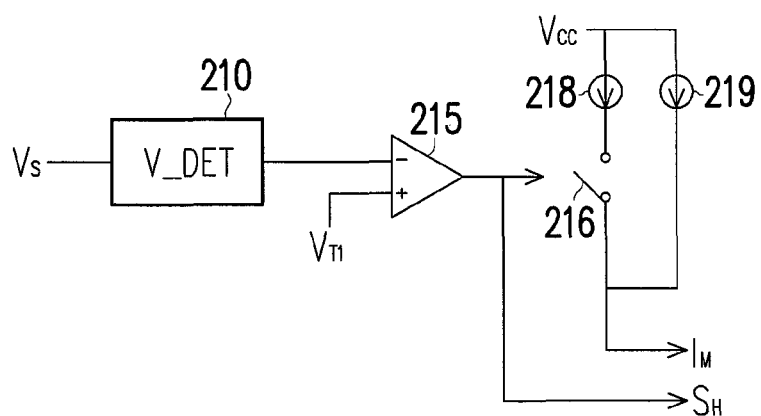
FIG. 4 shows an embodiment of the input control circuit 200 according to the invention.

FIG. 4 shows an embodiment of the input control circuit 200 according to the invention. An input-voltage detector 210 is coupled to detect the input voltage $V_{IN}$ via the signal $V_S$ for generating a control signal. This control signal is coupled to a comparator 215 to compare with a threshold $V_{T1}$ and generates the signal $S_H$. The signal $S_H$ is further coupled to control a switch 216. When the switch 216 is turned on, the value of the modulation signal $I_M$ is formed by current sources 218 and 219. The detail operation of the input voltage detector 210 can be found in the prior art of "Detection circuit for sensing the input voltage of transformer", U.S. Pat. No. 7,671,578; and the "Control method and circuit with indirect input voltage detection by switching current slope detection", U.S. Pat. No. 7,616,461.

Figure 5:
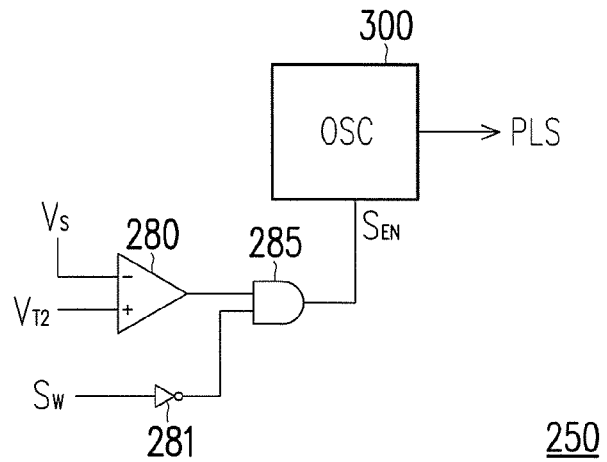
FIG. 5 shows an embodiment of the pulse generation circuit 250 according to the invention.

FIG. 5 shows an embodiment of the pulse generation circuit 250 according to the invention. The signal $V_S$ is coupled to a comparator 280 to compare with a threshold $V_{T2}$ and generate the enable signal $S_{EN}$ via an AND gate 285 once the VS is lower than the threshold $V_{T2}$. Another input of the AND gate 285 is coupled to the switching signal $S_W$ through an inverter 281. Enabling of the enable signal $S_{EN}$ indicates the transformer 10 is fully demagnetized. When the pulse signal PLS and the switching signal $S_W$ are generated in response to enabling of the enable signal $S_{EN}$, the power converter 400 is operated in boundary current mode (BCM).

Figure 6:
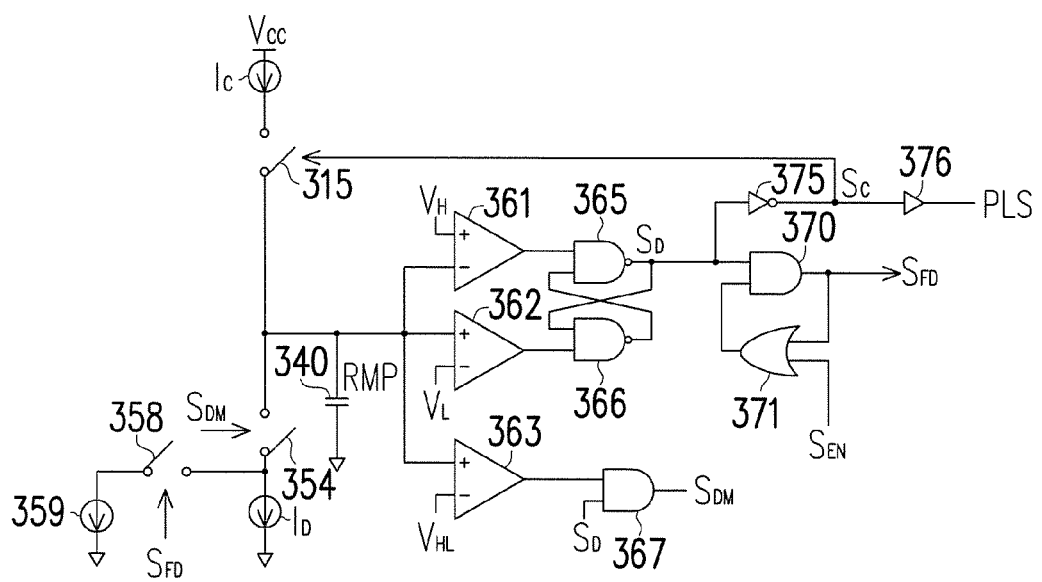
FIG. 6 shows an embodiment of the oscillation circuit 300 according to the invention.

FIG. 6 shows an embodiment of the oscillation circuit 300 according to the invention. The charge current $I_C$ is coupled to charge a capacitor 340 through a switch 315. The discharge current $I_D$ is coupled to discharge the capacitor 340 via a switch 354. The switch 315 is controlled by a charge signal $S_C$. The switch 354 is controlled by a discharge signal $S_{DM}$. The capacitor 340 thus generates a ramp signal RMP coupled to comparators 361, 362 and 363. The comparator 361 has a threshold $V_H$. The comparator 362 has a threshold $V_L$. The comparator 363 has a threshold $V_{HL}$, and the level of the thresholds is $V_H > V_{HL} > V_L$. NAND gates 365, 366 form a latch circuit coupled to receive the output signals of the comparators 361 and 362. The latch circuit outputs a discharge signal $S_D$. The discharge signal $S_D$ is a maximum frequency signal. The discharge signal $S_D$ and the output signal of the comparator 363 are connected to an AND gate 367 for generating the discharge signal $S_{DM}$. The discharge signal $S_D$ is connected to an inverters 375 to generate the charge signal $S_C$. The charge signal $S_C$ is connected to a buffer 376 to generate the pulse signal PLS. The discharge signal $S_D$ is further coupled to an AND gate 370 to generate a fast-discharge signal $S_{FD}$. The fast-discharge signal $S_{FD}$ and the enable signal $S_{EN}$ are connected to an OR gate 371. The output of the OR gate 371 is connected to another input of the AND gate 370. Therefore, the enable signal $S_{ENB}$ will trigger the fast-discharge signal $S_{FD}$ once the discharge signal $S_D$ is enabled.

The fast-discharge signal $S_{FD}$ can be turned off only when the discharge signal $S_D$ is disabled. A current source 359 is connected to the switch 358. The switch 358 is controlled by the fast-discharge signal $S_{FD}$. Since the current of the current source 359 is high, the capacitor 340 will be immediately discharged when the fast-discharge signal $S_{FD}$ is enabled. During the discharge period, the ramp signal RMP is held at the level of the threshold $V_{HL}$ until the enable signal $S_{EN}$ starts the fast-discharge signal $S_{FD}$. It is used for the BCM or DCM (discontinuous current mode) operations. Once the capacitor 340 is discharged lower than the threshold $V_L$, the discharge signal $S_D$ will be disabled.

The enable signal $S_{EN}$ is thus able to trigger the pulse signal PLS once the discharge signal $S_D$ is enabled. Therefore, the current of the charge current $I_C$, the discharge current $I_D$, the capacitance of the capacitor 340 and the thresholds $V_H$, $V_{HL}$, $V_L$ determine the maximum frequency of the discharge signal $S_D$, and determine the maximum frequency of the switching signal $S_W$.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A method for controlling a power converter, comprising:
   generating a switching signal coupled to switch a transformer for regulating an output of the power converter in accordance with a feedback signal, and a ramp signal;
   generating the ramp signal in accordance with a switching current signal and a slope compensation signal;
   generating the slope compensation signal in response to an input voltage signal; and
   generating the input voltage signal in response to the level of the input voltage of the power converter,
   wherein the feedback signal is generated in accordance with the output of the power converter, and the switching current signal is correlated with a switching current of the transformer.

2. The method as claimed in claim 1, wherein the slope compensation signal is synchronized with the switching signal.

3. The method as claimed in claim 1, wherein the level of the switching current signal is controlled by the level of the input voltage of the power converter.

4. The method as claimed in claim 1, wherein the input voltage signal is generated through the detection from a winding of the transformer.

5. The method as claimed in claim 1, further comprising:
   limiting a maximum switching frequency of the switching signal;
   switching on the switching signal in response to a signal detected from a winding of the transformer.

6. A power converter, comprising:
   a control circuit generating a switching signal;
   a first voltage divider coupled to the control circuit; and
   a transformer coupled to the first voltage divider, wherein the transformer and the first voltage divider generate an input voltage signal in response to the level of an input voltage of the power converter, and the switching signal is coupled to switch the transformer for regulating an output of the power converter in accordance with a feedback signal and a ramp signal,
   wherein the control circuit comprises:
      a second voltage divider, wherein the second voltage divider generates the ramp signal in accordance with a switching current signal and a slope compensation signal; and
      a signal generation unit coupled to the second voltage divider, wherein the signal generation unit generates the slope compensation signal in response to the input voltage signal,
   wherein the feedback signal is generated in accordance with the output of the power converter, and the switching current signal is correlated with a switching current of the transformer.

7. The power converter as claimed in claim 6, wherein the slope compensation signal is synchronized with the switching signal.

8. The power converter as claimed in claim 6, wherein the level of the switching current signal is controlled by the level of the input voltage of the power converter.

9. The power converter as claimed in claim 6, wherein the input voltage signal is generated through the detection from a winding of the transformer.

10. The power converter as claimed in claim 6, wherein the control circuit further comprises:
   a pulse generation circuit switching on the switching signal in response to a signal detected from a winding of the transformer, and the pulse generation circuit comprising an oscillation circuit,
   wherein the oscillation circuit comprises a frequency limiting unit for limiting a maximum switching frequency of the switching signal.

* * * * *